(12) United States Patent
Sun et al.

(10) Patent No.: US 11,081,992 B2
(45) Date of Patent: Aug. 3, 2021

(54) VIRTUAL VOLTAGE INJECTION-BASED SPEED SENSOR-LESS DRIVING CONTROL METHOD FOR INDUCTION MOTOR

(71) Applicants: HUAZHONG UNIVERSITY OF SCIENCE AND TECHNOLOGY, Hubei (CN); HARBIN INSTITUTE OF TECHNOLOGY, Heilongjiang (CN)

(72) Inventors: Wei Sun, Hubei (CN); Dianguo Xu, Hubei (CN)

(73) Assignees: HUAZHONG UNIVERSITY OF SCIENCE AND TECHNOLOGY, Hubei (CN); HARBIN INSTITUTE OF TECHNOLOGY, Heilongjiang (CN)

(*) Notice: Subject to any disclaimer, the term of this patent is extended or adjusted under 35 U.S.C. 154(b) by 0 days.

(21) Appl. No.: 16/772,160

(22) PCT Filed: May 25, 2018

(86) PCT No.: PCT/CN2018/088315
§ 371 (c)(1),
(2) Date: Jun. 12, 2020

(87) PCT Pub. No.: WO2019/218389
PCT Pub. Date: Nov. 21, 2019

(65) Prior Publication Data
US 2021/0075354 A1  Mar. 11, 2021

(30) Foreign Application Priority Data
May 15, 2018  (CN) .................. 201810462918.6

(51) Int. Cl.
*H02P 21/13* (2006.01)
*H02P 21/04* (2006.01)
(Continued)

(52) U.S. Cl.
CPC .............. *H02P 21/13* (2013.01); *H02P 6/183* (2013.01); *H02P 21/0021* (2013.01);
(Continued)

(58) Field of Classification Search
CPC .......... H02P 21/13; H02P 21/04; H02P 21/18; H02P 6/183; H02P 27/12; H02P 21/0021; H02P 21/28
See application file for complete search history.

(56) References Cited

U.S. PATENT DOCUMENTS

| | | | |
|---|---|---|---|
| 2005/0146306 A1* | 7/2005 | Ha | H02P 21/04 318/807 |
| 2017/0194889 A1* | 7/2017 | Iwaji | H02P 27/08 |
| 2020/0212835 A1* | 7/2020 | Fukuhara | H02P 6/28 |

FOREIGN PATENT DOCUMENTS

| | | | |
|---|---|---|---|
| CN | 103338000 | 10/2013 | |
| CN | 103338000 A | * 10/2013 | ............. H02P 21/13 |

OTHER PUBLICATIONS

"Written Opinion of the International Searching Authority (Form PCT/ISA/237) of PCT/JP2018/088315," dated Jan. 25, 2019, with English translation thereof, pp. 1-6.

* cited by examiner

Primary Examiner — Kawing Chan
Assistant Examiner — Bradley R Brown
(74) Attorney, Agent, or Firm — JCIP Global Inc.

(57) ABSTRACT

A virtual voltage injection-based speed sensor-less driving control method for an induction motor is provided. First, a virtual voltage signal is injected into a motor flux linkage and rotating speed observer so that there is a difference between an input of the motor flux linkage and rotating speed observer and a command input of the motor. Then, based on any type of the motor flux linkage and rotating speed observer, a motor flux linkage rotation angle and a
(Continued)

motor rotor speed are estimated, and the induction motor is driven to run normally with a certain control strategy (such as vector control). Then, based on a signal designed according to this method and injected only into the motor flux linkage and rotating speed observer, the induction motor driven by a speed sensor-less control system for the induction motor may be ensured to output 150% of a rated torque when running at a motor low synchronous rotating speed and a motor zero synchronous rotating speed, and the stability thereof may be kept for a long time.

11 Claims, 4 Drawing Sheets

(51) Int. Cl.
      *H02P 21/18*       (2016.01)
      *H02P 21/28*       (2016.01)
      *H02P 27/12*       (2006.01)
      *H02P 21/00*       (2016.01)
      *H02P 6/18*       (2016.01)

(52) U.S. Cl.
      CPC .............. *H02P 21/04* (2013.01); *H02P 21/18* (2016.02); *H02P 21/28* (2016.02); *H02P 27/12* (2013.01)

VIRTUAL VOLTAGE INJECTION-BASED SPEED SENSOR-LESS DRIVING CONTROL METHOD FOR INDUCTION MOTOR

CROSS-REFERENCE TO RELATED APPLICATION

This application is a 371 application of the International PCT application serial no. PCT/CN2018/088315, filed on May 25, 2018, which claims the priority benefits of China Patent Application No. 201810462918.6, filed on May 15, 2018. The entirety of each of the above-mentioned patent applications is hereby incorporated by reference herein and made a part of this specification.

BACKGROUND OF THE INVENTION

Field of the Invention

The invention belongs to the motor control field, and in particular relates to a virtual voltage injection-based speed sensor-less driving control method for induction motor.

Description of Related Art

Induction motor (IM) is an AC motor relying on electromagnetic induction to induce rotor current to achieve electromechanical energy conversion, and is substantially an asynchronous motor.

Motor speed detection devices mostly use speed sensors. The installation of these speed sensors increases the cost of the motor control system. In addition, speed sensors are not suitable for harsh environments such as high humidity, vibration, and electromagnetic noise interference. Therefore, the speed sensorless technology, that is, how to quickly and accurately estimate the rotating speed value of the motor via known speed control system parameters, has become another hot spot in today's research. However, there are also defects in the speed sensor-less driving control system: the motor low-speed operation has weak loading capacity and instability at low-speed power generation.

In order to ensure that the speed sensor-less drive system for induction motor may run stably for a long time when the motor synchronous rotating speed is zero or the motor rotor speed is zero, many studies have been done in recent years, mainly including low-frequency current signal injection method, high-frequency current/voltage signal injection method, rotor position estimation by detecting zero sequence current harmonics, etc. However, the above methods require the induction motor to have significant magnetic field anisotropy, and depend on motor design, and have issues such as torque fluctuation and noise. No enterprise or research institution may realize the stable operation of the speed sensor-less drive system for induction motor at zero synchronous rotating speed without the signal injection of the motor.

SUMMARY OF THE INVENTION

In view of the defects of the prior art, an object of the invention is to solve the technical issue of instability of the existing speed sensor-less control system for the induction motor at low synchronous rotating speed and zero synchronous rotating speed.

To achieve the above object, in a first aspect, the invention provides a virtual voltage injection-based speed sensor-less driving control method for induction motor, wherein in the method, based on an existing speed sensor-less drive system for induction motor, a virtual voltage injection module is added between stator voltage command input values $u_{s\alpha}$ and $u_{s\beta}$ and flux linkage observer stator voltage input values $u^*_{s\alpha}$ and $u^*_{s\beta}$ of a motor in an $\alpha\beta$ coordinate system, or a virtual voltage injection module is added between stator voltage command input values $u_{sd}$ and $u_{sq}$ and flux linkage observer stator voltage input values $u^*_{sd}$ and $u^*_{sq}$ of the motor in a dq coordinate system, and the method includes the following steps:

S1. k is calculated based on a parameter of an induction motor, wherein k is a proportional relationship in the virtual voltage injection module;

S2. The stator voltage command input values $u_{s\alpha}$ and $u_{s\beta}$ of the motor in the $\alpha\beta$ coordinate system are multiplied by the proportional relationship k respectively to obtain the flux linkage observer stator voltage input values $u^*_{s\alpha}$ and $u^*_{s\beta}$ in the $\alpha\beta$ coordinate system; or the stator voltage command input values $u_{sd}$ and $u_{sq}$ of the motor in the dq coordinate system are multiplied by the proportional relationship k respectively to obtain the flux linkage observer stator voltage input values $u^*_{sd}$ and $u^*_{sq}$ in the dq coordinate system;

the operation is equivalent to injecting $u_{s\alpha\_inj}$ and $u_{s\beta\_inj}$ on the basis of $u_{s\alpha}$ and $u_{s\beta}$, wherein $$u_{s\alpha\_inj} = (k-1)u_{s\alpha}$$
$$u_{s\beta\_inj} = (k-1)u_{s\beta},$$

to satisfy $$u^*_{s\alpha} = u_{s\alpha\_inj} + u_{s\alpha} = ku_{s\alpha}$$
$$u^*_{s\beta} = u_{s\beta\_inj} + u_{s\beta} = ku_{s\beta},$$

in the formula, $u_{s\alpha\_inj}$ is a virtual voltage injection value under an $\alpha$-axis, and $u_{s\beta\_inj}$ is a virtual voltage injection value under a $\beta$-axis;

or the operation is equivalent to injecting $u_{sd\_inj}$ and $u_{sq\_inj}$ on the basis of $u_{sd}$ and $u_{sq}$, wherein $$u_{sd\_inj} = (k-1)u_{sd}$$
$$u_{sq\_inj} = (k-1)u_{sq},$$

to satisfy $$u^*_{sd} = u_{sd\_inj} + u_{sd} = ku_{sd}$$
$$u^*_{sq} = u_{sq\_inj} + u_{sq} = ku_{sq},$$

in the formula, $u_{sd\_inj}$ is a virtual voltage injection value under a d-axis, and $u_{sq\_inj}$ is a virtual voltage injection value under a q-axis;

S3. A dynamic mathematical model of a flux linkage observer is constructed based on $u^*_{s\alpha}$ and $u^*_{s\beta}$ or $u^*_{sd}$ and $u^*_{sq}$;

S4. An induction motor rotor speed $\hat{\omega}_r$ is observed using a rotating speed observer and a rotation angle $\hat{\theta}$ of a rotor flux linkage is observed using the flux linkage observer based on the dynamic mathematical model of the flux linkage observer;

S5. A control of speed sensor-less induction motor rotating speed and torque is implemented by using the observed rotor speed $\hat{\omega}_r$ for a rotating speed PI adjustment module and the flux linkage observer and using the observed rotor flux linkage rotation angle $\hat{\theta}$ for a 2-phase synchronous rotation coordinate/2-phase static coordinate conversion module;

wherein the αβ coordinate system is a 2-phase static coordinate system and the dq coordinate system is a 2-phase synchronous rotation coordinate system.

Specifically, the virtual voltage injection module is implemented by an adder, a multiplier, or a combination thereof.

Specifically, a calculation formula of the proportional relationship k in step S1 is as follows:

$$k = p\frac{R_r L_m}{L_r} + 1$$

wherein p is a constant greater than zero, and is obtained based on the rated parameters of induction motor; $R_r$ is induction motor rotor resistance; $L_m$ is induction motor mutual inductance; and $L_r$ is and induction motor rotor side inductance.

Specifically, the dynamic mathematical model of the flux linkage observer constructed based on $u^*_{s\alpha}$ and $u^*_{s\beta}$ in step S3 is as follows:

$$\begin{cases} \frac{d}{dt}\hat{\vec{x}} = A_1\hat{\vec{x}} + \vec{u}^*_s \\ \hat{\vec{i}}_s = C\hat{\vec{x}} \end{cases}$$

wherein $\hat{\vec{x}} = [\hat{\lambda}_{s\alpha} \ \hat{\lambda}_{s\beta} \ \hat{\lambda}_{r\alpha} \ \hat{\lambda}_{r\beta}]^T$, $\vec{u}^*_s = [u^*_{s\alpha} \ u^*_{s\beta} \ 0 \ 0]^T$, $\hat{\vec{i}}_s = [\hat{i}_{s\alpha} \ \hat{i}_{s\beta}]^T$ $$A_1 = \begin{bmatrix} a_{11} & 0 & a_{13} & 0 \\ 0 & a_{11} & 0 & a_{13} \\ a_{31} & 0 & a_{33} & \hat{\omega}_r \\ 0 & a_{31} & \hat{\omega}_r & a_{33} \end{bmatrix}, C = \begin{bmatrix} h_1 & 0 & h_2 & 0 \\ 0 & h_1 & 0 & h_2 \end{bmatrix}$$

$$a_{11} = \frac{-R_s}{\delta L_s}, a_{13} = \frac{R_s L_m}{\delta L_s L_r}, a_{31} = \frac{R_r L_m}{\delta L_s L_r}, a_{33} = \frac{-R_r}{\delta L_r}$$

$$h_1 = \frac{1}{\delta L_s}, h_2 = \frac{-L_m}{\delta L_s L_r}, \delta = 1 - \frac{L_m^2}{L_s L_r}$$

the dynamic mathematical model of the flux linkage observer constructed based on $u^*_{sd}$ and $u^*_{sq}$ is as follows:

$$\begin{cases} \frac{d}{dt}\hat{\vec{x}} = A_2\hat{\vec{x}} + \vec{u}^*_s \\ \hat{\vec{i}}_s = C\hat{\vec{x}} \end{cases}$$

wherein $\hat{\vec{x}} = [\hat{\lambda}_{sd} \ \hat{\lambda}_{sq} \ \hat{\lambda}_{rd} \ \hat{\lambda}_{rq}]^T$, $\vec{u}^*_s = [u^*_{sd} \ u^*_{sq} \ 0 \ 0]^T$, $\hat{\vec{i}}_s = [\hat{i}_{sd} \ \hat{i}_q]^T$ $$A_2 = \begin{bmatrix} a_{11} & \omega_e & a_{13} & 0 \\ \omega_e & a_{11} & 0 & a_{13} \\ a_{31} & 0 & a_{33} & \omega_e - \hat{\omega}_r \\ 0 & a_{31} & -\omega_e + \hat{\omega}_r & a_{33} \end{bmatrix}, C = \begin{bmatrix} h_1 & 0 & h_2 & 0 \\ 0 & h_1 & 0 & h_2 \end{bmatrix}$$

$$a_{11} = \frac{-R_s}{\delta L_s}, a_{13} = \frac{R_s L_m}{\delta L_s L_r}, a_{31} = \frac{R_r L_m}{\delta L_s L_r}, a_{33} = \frac{-R_r}{\delta L_r}$$

$$h_1 = \frac{1}{\delta L_s}, h_2 = \frac{-L_m}{\delta L_s L_r}, \delta = 1 - \frac{L_m^2}{L_s L_r}$$

wherein $\hat{\lambda}_{s\alpha}$, $\hat{\lambda}_{s\beta}$, $\hat{\lambda}_{sd}$, and $\hat{\lambda}_{sq}$ are stator flux linkage observation values under the α-axis, the β-axis, the d-axis, and the q-axis respectively; $\hat{\lambda}_{r\alpha}$, $\hat{\lambda}_{r\beta}$, $\hat{\lambda}_{rd}$, and $\hat{\lambda}_{rq}$ are rotor flux linkage observation values under the α-axis, the β-axis, the d-axis, and the q-axis respectively; $\hat{i}_{s\alpha}$, $\hat{i}_{s\beta}$, $\hat{i}_{sd}$, and $\hat{i}_{sq}$ are stator current observation values under the α-axis, the β-axis, the d-axis, and the q-axis respectively; $\omega_e$ is a synchronous rotating speed; $R_s$ and $R_r$ are a motor stator resistance and rotor resistance respectively; and $L_s$, $L_r$, and $L_m$ are a motor stator side inductance, a motor rotor side inductance, and a motor mutual inductance respectively.

Specifically, when the dynamic mathematical model of the flux linkage observer is constructed based on $u^*_{s\alpha}$ and $u^*_{s\beta}$, a calculation formula of the induction motor rotor speed $\hat{\omega}_r$ in step S4 is as follows:

$$\hat{\omega}_r = k_p[(i_{s\alpha} - \hat{i}_{s\alpha})\hat{\lambda}_{r\beta} - (i_{s\beta} - \hat{i}_{s\beta})\hat{\lambda}_{r\alpha}] + k_i S_1$$

when the dynamic mathematical model of the flux linkage observer is constructed based on $u^*_{sd}$ and $u^*_{sq}$, the calculation formula of the induction motor rotor speed $\hat{\omega}_r$ in step S4 is as follows:

$$\hat{\omega}_r = k_p[(i_{sd} - \hat{i}_{sd})\hat{\lambda}_{rq} - (i_{sq} - \hat{i}_{sq})\hat{\lambda}_{rd}] + k_i S_2$$

wherein $k_p$ and $k_i$ are a proportional link gain and an integral link gain of the rotating speed observer respectively; $i_{s\alpha}$, $i_{s\beta}$, $i_{sd}$, and $i_{sq}$ are stator current actual measured values under the α-axis, the β-axis, the d-axis, and the q-axis respectively; $\hat{i}_{s\alpha}$, $\hat{i}_{s\beta}$, $\hat{i}_{sd}$, and $\hat{i}_{sq}$ are stator current observation values under the α-axis, the β-axis, the d-axis, and the q-axis respectively; $\hat{\lambda}_{r\alpha}$, $\hat{\lambda}_{r\beta}$, $\hat{\lambda}_{rd}$, and $\hat{\lambda}_{rq}$ are rotor flux linkage observation values under the α-axis, the β-axis, the d-axis, and the q-axis respectively; and $S_1$ and $S_2$ are time integral values of $[(i_{s\alpha} - \hat{i}_{s\alpha})\hat{\lambda}_{r\beta} - (i_{s\beta} - \hat{i}_{s\beta})\hat{\lambda}_{r\alpha}]$ and $[(i_{sd} - \hat{i}_{sd})\hat{\lambda}_{rq} - (i_{sq} - \hat{i}_{sq})\hat{\lambda}_{rd}]$ respectively.

Specifically, when the dynamic mathematical model of the flux linkage observer is constructed based on $u^*_{s\alpha}$ and $u^*_{s\beta}$, the calculation formula of the rotation angle $\hat{\theta}$ in step S4 is as follows:

$$\hat{\theta} = \arctan\frac{\hat{\lambda}_{r\beta}}{\hat{\lambda}_{r\alpha}}$$

when the dynamic mathematical model of the flux linkage observer is constructed based on $u^*_{sd}$ and $u^*_{sq}$ the calculation formula of the rotation angle $\hat{\theta}$ in step S4 is as follows:

$$\omega_s = \frac{R_r L_m}{L_r \hat{\lambda}_{rd}} i_{sq}$$

$$\hat{\theta} = S_3$$

wherein $\hat{\lambda}_{r\alpha}$, $\hat{\lambda}_{r\beta}$, and $\hat{\lambda}_{rd}$ are the rotor flux linkage observation values under the α-axis, the β-axis, and the d-axis respectively; $i_{sq}$ is a stator current actual measured value under the q-axis, $\omega_s$ is a slip rotating speed, $R_r$ is a motor rotor resistance, $L_r$ and $L_m$ are a motor rotor side inductance and a motor mutual inductance respectively, and $S_3$ represents a time integral for $(\hat{\omega}_r+\omega_s)$.

Specifically, step S5 includes the following steps:

S501, A rotating speed PI control is performed after taking a difference with a corresponding rotating speed command $\omega^*_r$ using the observed induction motor rotor speed $\hat{\omega}_r$ as a feedback value of the rotating speed PI adjustment module;

S502, The observed flux linkage rotation angle $\hat{\theta}$ is used for a coordinate conversion calculation in a 2-phase synchronous rotation coordinate/2-phase static coordinate conversion module;

S503, An output $i^*_{sq}$ of the rotating speed PI adjustment module is used as a command of a q-axis current PI adjustment module and an output $i^*_{sd}$ of a flux linkage current command given module is used as a command of a d-axis current PI adjustment module; induction motor two-phase currents $i_U$ and $i_V$ obtained by sampling via a current sensor is inputted to a 3-phase static coordinate/2-phase static coordinate conversion module, and then $\vec{i}_s$ is outputted to the 2-phase synchronous rotation coordinate/2-phase static coordinate conversion module, and lastly a d-axis current $i_{sd}$ and a q-axis current $i_{sq}$ in the 2-phase synchronous rotation coordinate system are obtained, and a current PI control is performed after using the obtained d-axis current and q-axis current as feedback values of a d-axis current PI regulator and a q-axis current PI regulator respectively and taking a difference with corresponding flux linkage current commands $i^*_{sd}$ and $i^*_{sq}$;

S504, Outputs $u_{sd}$ and $u_{sq}$ of the d-axis and q-axis current PI adjustment modules are inputted to the 2-phase synchronous rotation coordinate/2-phase static coordinate conversion module, which converts a motor input voltage command in the 2-phase synchronous rotation coordinate system to a motor input voltage command $\vec{u}_s$ in the 2-phase static coordinate system;

S505, $\vec{u}_s$ is outputted to a voltage space vector pulse width modulation module to generate a switching signal capable of controlling a switching device $S_A$, $S_B$, $S_C$, thereby achieving an object of controlling induction motor speed and torque.

In a second aspect, an embodiment of the invention provides a computer-readable storage medium, wherein a computer program is stored on the computer-readable storage medium, and when the computer program is executed by a processor, the virtual voltage injection-based speed sensor-less driving control method for induction motor of the first aspect is implemented.

In general, the above technical solutions conceived by the invention have the following beneficial effects compared with the prior art: in the invention, a virtual voltage injection module is added between the stator voltage command input values $u_{s\alpha}$ and $u_{s\beta}$ and the flux linkage observer stator voltage input values $u^*_{s\alpha}$ and $u^*_{s\beta}$ of the motor in the $\alpha\beta$ coordinate system, or, a virtual voltage injection module is added between the stator voltage command input values $u_{sd}$ and $u_{sq}$ and the flux observer stator voltage input values $u^*_{sd}$ and $u^*_{sq}$ of the motor in the dq coordinate system, thereby achieving:

(1) Without signal injection into the motor body, an induction motor controlled by the speed sensor-less induction motor drive system and outputting 150% of motor rated torque at zero synchronous rotating speed or low synchronous rotating speed may be realized.

(2) Without signal injection into the motor body, an induction motor controlled by the speed sensor-less induction motor drive system and running stably for a long time at 0% motor rated torque and zero rotor speed and starting normally after running for a long time may be realized.

(3) Without signal injection into the motor body, an induction motor controlled by the speed sensor-less induction motor drive system and switching between forward and reverse rotation of motor speed at any acceleration and deceleration time under the condition that the load is 150% of the motor rated torque without change may be realized.

DESCRIPTION OF THE EMBODIMENTS

In order to make the objects, technical solutions, and advantages of the invention clearer, the invention is further described in detail below in conjunction with the accompanying figures and embodiments. It should be understood that the specific embodiments described herein are only used to explain the invention, and are not intended to limit the invention.

Figure 1:
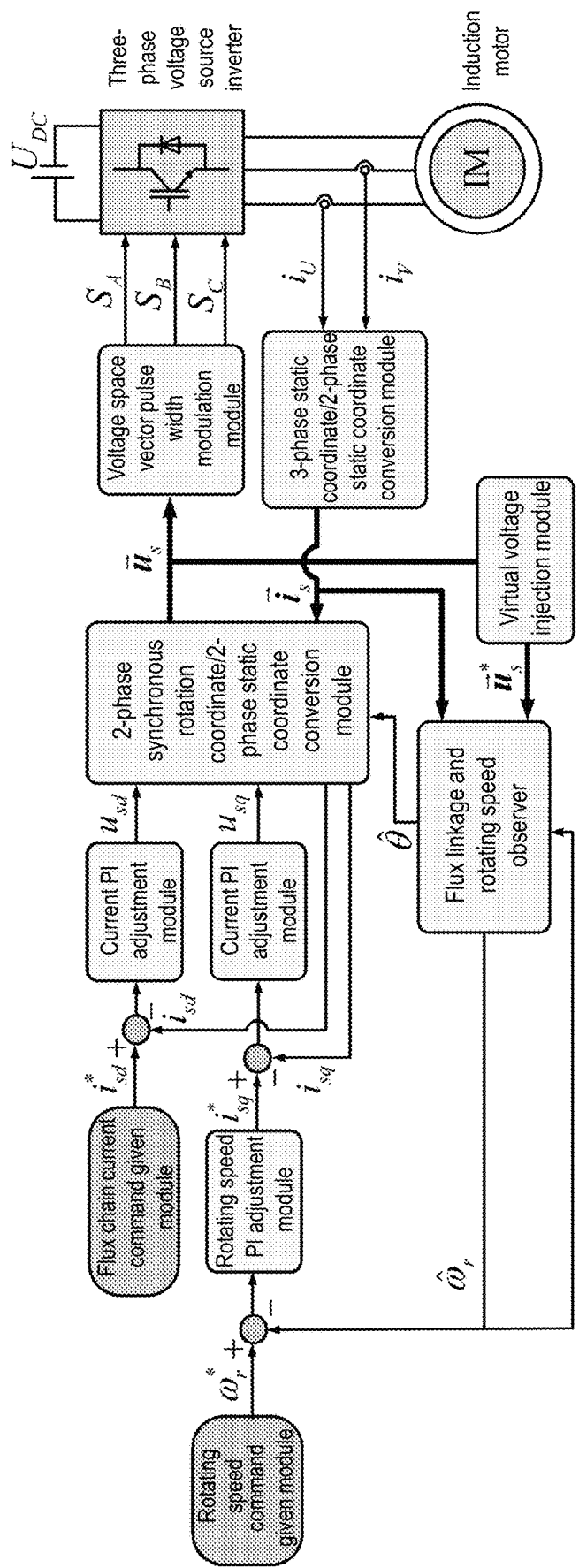
FIG. 1 is a structural diagram of a speed sensor-less induction motor driving control system based on virtual voltage injection provided by embodiment 1 of the invention.

FIG. 1 is a structural diagram of a i speed sensor-less driving control for induction motor based on virtual voltage injection provided by embodiment 1 of the invention.

The hardware part of the speed sensor-less drive system for induction motor includes: a three-phase voltage source inverter and an induction motor. A three-phase AC power obtains a DC bus voltage $U_{DC}$ via uncontrolled rectification, which is supplied to a voltage source inverter, and the induction motor is controlled using an inverter to control torque and rotating speed. The three-phase voltage source inverter includes voltage and current sensors.

The software part of the speed sensor-less drive system for induction motor includes: a 3-phase static coordinate/2-phase static coordinate conversion module, a 2-phase synchronous rotation coordinate/2-phase static coordinate conversion module, a voltage space vector pulse width modulation module, a current PI (proportion integration) adjustment module, a rotating speed PI adjustment module, a flux linkage current command given module, a rotating speed command given module, a flux linkage and rotating speed observer module, and a virtual voltage injection module.

The control method of the induction motor is mainly divided into VF control, vector control, and direct torque control, and the vector control strategy is preferred in the embodiments of the invention. The invention mainly relates to a virtual voltage injection module, and the other modules are functional modules of speed sensor-less induction motor vector control, which is common knowledge in the art. The virtual voltage injection module is implemented by an adder, a multiplier, or a combination thereof.

Embodiment 1 The control system is implemented by adding a virtual voltage injection module between stator voltage command input values $u_{s\alpha}$ and $u_{s\beta}$ and flux linkage observer stator voltage input values $u^*_{s\alpha}$ and $u^*_{s\beta}$ of the motor in an $\alpha\beta$ coordinate system. The following describes the control method of the entire system, including step S1 to step S5.

S1. k is calculated based on a parameter of an induction motor, wherein k is a proportional relationship in the virtual voltage injection module. The calculation formula is as follows:

$$k = p\frac{R_r L_m}{L_r} + 1$$

wherein p is a constant greater than zero, and is obtained based on the rated parameters of induction motor; $R_r$ is induction motor rotor resistance; $L_m$ is induction motor mutual inductance; and $L_r$ is induction motor rotor side inductance.

After the proportional relationship k is calculated, it exists as a constant in the motor controller, and the value thereof does not change with each motor parameter.

S2. The stator voltage command input values $u_{s\alpha}$ and $u_{s\beta}$ of the motor in the $\alpha\beta$ coordinate system are multiplied by the proportional relationship k respectively, to obtain the flux linkage observer stator voltage input values $u^*_{s\alpha}$ and $u^*_{s\beta}$ in the $\alpha\beta$ coordinate system;

the operation is equivalent to injecting $u_{s\alpha\_inj}$ and $u_{s\beta\_inj}$ on the basis of $u_{s\alpha}$ and $u_{s\beta}$, wherein $$u_{s\alpha\_inj} = (k-1)u_{s\alpha}$$
$$u_{s\beta\_inj} = (k-1)u_{s\beta},$$

to satisfy $$u^*_{s\alpha} = u_{s\alpha\_inj} + u_{s\alpha} = ku_{s\alpha}$$
$$u^*_{s\beta} = u_{s\beta\_inj} + u_{s\beta} = ku_{s\beta},$$

in the formula, $u_{s\alpha\_inj}$ is a virtual voltage injection value under an $\alpha$-axis, and $u_{s\beta\_inj}$ is a virtual voltage injection value under a $\beta$-axis;

S3. A dynamic mathematical model of a flux linkage observer is constructed based on $u^*_{s\alpha}$ and $u^*_{s\beta}$. The dynamic mathematical model is as follows:

$$\begin{cases} \frac{d}{dt}\hat{\vec{x}} = A_1\hat{\vec{x}} + \vec{u}^*_s \\ \hat{\vec{i}}_s = C\hat{\vec{x}} \end{cases}$$

wherein: $\hat{\vec{x}} = [\hat{\lambda}_{s\alpha} \; \hat{\lambda}_{s\beta} \; \hat{\lambda}_{r\alpha} \; \hat{\lambda}_{r\beta}]^T$, $\vec{u}^*_s = [u^*_{s\alpha} \; u^*_{s\beta} \; 0 \; 0]^T$, $$\hat{\vec{i}}_s = [\hat{i}_{s\alpha} \; \hat{i}_{s\beta}]^T, A_1 = \begin{bmatrix} a_{11} & 0 & a_{13} & 0 \\ 0 & a_{11} & 0 & a_{13} \\ a_{31} & 0 & a_{33} & -\hat{\omega}_r \\ 0 & a_{31} & \hat{\omega}_r & a_{33} \end{bmatrix},$$

$$C = \begin{bmatrix} h_1 & 0 & h_2 & 0 \\ 0 & h_1 & 0 & h_2 \end{bmatrix}$$

$$a_{11} = \frac{-R_s}{\delta L_s}, a_{13} = \frac{R_s L_m}{\delta L_s L_r}, a_{31} = \frac{R_r L_m}{\delta L_s L_r}, a_{33} = \frac{-R_r}{\delta L_r}$$

$$h_1 = \frac{1}{\delta L_s}, h_2 = \frac{-L_m}{\delta L_s L_r}, \delta = 1 - \frac{L_m^2}{L_s L_r}$$

wherein $\hat{\lambda}_{s\alpha}$ and $\hat{\lambda}_{s\beta}$ are stator flux linkage observation values under the $\alpha$-axis and the $\beta$-axis respectively; $\hat{\lambda}_{r\alpha}$ and $\hat{\lambda}_{r\beta}$ are rotor flux linkage observation values under the $\alpha$-axis and the $\beta$-axis respectively; $\hat{i}_{s\alpha}$ and $\hat{i}_{s\beta}$ are stator current observation values under the $\alpha$-axis and the $\beta$-axis respectively; $R_s$ and $R_r$ are motor stator current and rotor resistance respectively; $L_s$, $L_r$, and $L_m$ are motor stator side inductance, motor rotor side inductance, and motor mutual inductance respectively.

S4. An induction motor rotor speed $\hat{\omega}_r$ is observed using a rotating speed observer and a rotation angle $\hat{\theta}$ of a rotor flux linkage is observed using the flux linkage observer based on the dynamic mathematical model of the flux linkage observer;

$$\hat{\omega}_r = k_p\left[(i_{s\alpha} - \hat{i}_{s\alpha})\hat{\lambda}_{r\beta} - (i_{s\beta} - \hat{i}_{s\beta})\hat{\lambda}_{r\alpha}\right] + k_i S_1$$

$$\hat{\theta} = \arctan\frac{\hat{\lambda}_{r\beta}}{\hat{\lambda}_{r\alpha}}$$

wherein $k_p$ and $k_i$ are proportional link gain and integral link gain of the rotating speed observer respectively; $i_{s\alpha}$ and $i_{s\beta}$ are stator current actual measured values under the $\alpha$-axis and the $\beta$-axis respectively; $\hat{i}_{s\alpha}$ and $\hat{i}_{s\beta}$ are stator current observation values under the $\alpha$-axis and the $\beta$-axis respectively; $\hat{\lambda}_{r\alpha}$ and $\hat{\lambda}_{r\beta}$ are rotor flux linkage observation values under the $\alpha$-axis and the $\beta$-axis respectively; and $S_1$ is a time integral value of $[(i_{s\alpha}-\hat{i}_{s\alpha})\hat{\lambda}_{r\beta}-(i_{s\beta}-\hat{i}_{s\beta})\hat{\lambda}_{r\alpha}]$.

S5. A control of speed sensor-less induction motor rotating speed and torque is implemented by using the observed rotor speed $\hat{\omega}_r$ for a rotating speed PI adjustment module and the flux linkage observer and using the observed rotor flux linkage rotation angle $\hat{\theta}$ for the 2-phase synchronous rotation coordinate/2-phase static coordinate conversion module.

Specifically, step S5 includes the following steps:

S501, A rotating speed PI control is performed after taking a difference with a corresponding rotating speed command $\omega_r^*$ using the observed induction motor rotor speed $\hat{\omega}_r$ as a feedback value of the rotating speed PI adjustment module;

S502, The observed flux linkage rotation angle $\hat{\theta}$ is used for a coordinate conversion calculation in the 2-phase synchronous rotation coordinate/2-phase static coordinate conversion module;

S503, An output $i^*_{sq}$ of the rotating speed PI adjustment module is used as a command of a q-axis current PI adjustment module and an output $i^*_{sd}$ of a flux linkage current command given module is used as a command of a d-axis current PI adjustment module; induction motor two-phase currents $i_U$ and $i_V$ obtained by sampling via a current sensor is inputted to a 3-phase static coordinate/2-phase static coordinate conversion module, and then $\vec{i}_s$ is outputted to the 2-phase synchronous rotation coordinate/2-phase static coordinate conversion module, and lastly a d-axis current $i_{sd}$ and a q-axis current $i_{sq}$ in the 2-phase synchronous rotation coordinate system are obtained, and a current PI control is performed after using the obtained d-axis current and q-axis current as feedback values of a d-axis current PI regulator and a q-axis current PI regulator respectively and taking a difference with corresponding flux linkage current commands i*$_{sd}$ and i*$_{sq}$;

S504, Outputs u$_{sd}$ and u$_{sq}$ of the d-axis and q-axis current PI adjustment modules are inputted to the 2-phase synchronous rotation coordinate/2-phase static coordinate conversion module, which converts a motor input voltage command in the 2-phase synchronous rotation coordinate system to a motor input voltage command $\vec{u}_s$ in the 2-phase static coordinate system;

S505, $\vec{u}_s$, is outputted to a voltage space vector pulse width modulation module to generate a switching signal capable of controlling a switching device S$_A$, S$_B$, S$_C$, thereby achieving an object of controlling induction motor speed and torque.

Figure 2:
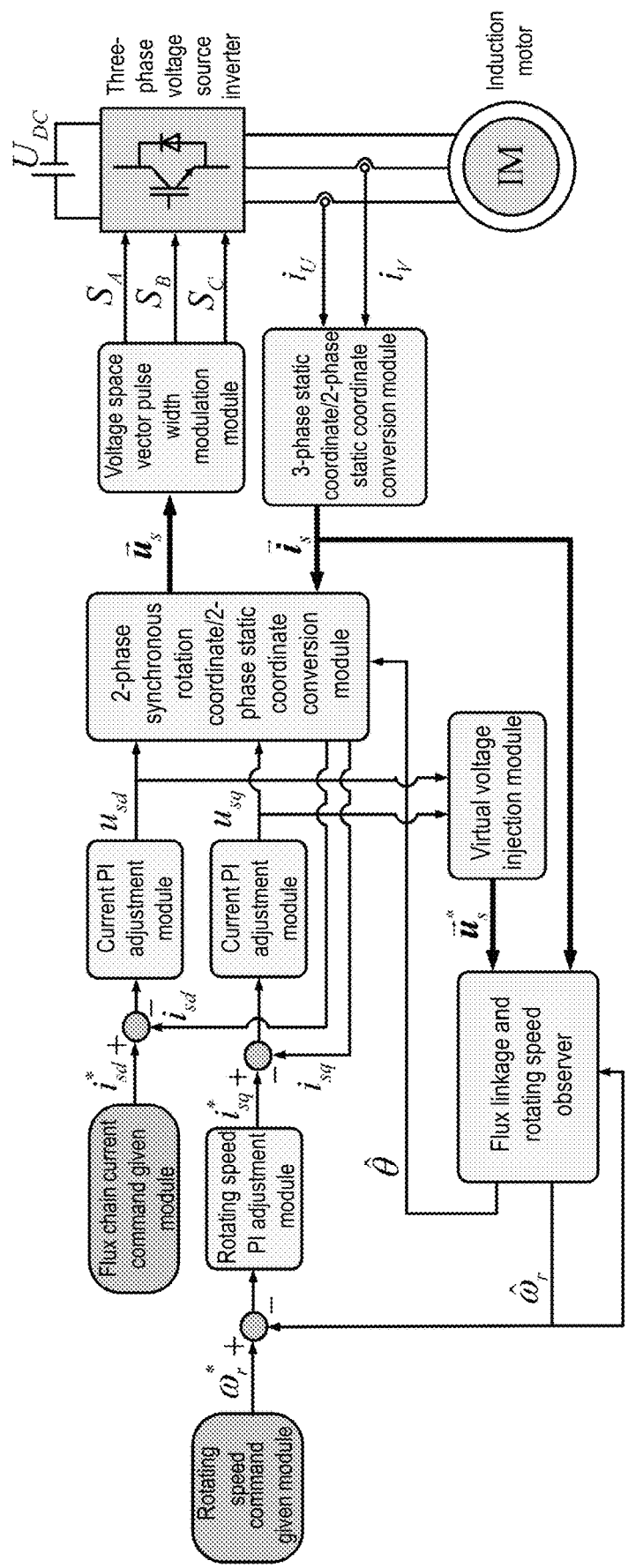
FIG. 2 is a structural diagram of a speed sensor-less induction motor driving control system based on virtual voltage injection provided by embodiment 2 of the invention.

As shown in FIG. 2, Embodiment 2 The control system is implemented by adding a virtual voltage injection module between the stator voltage command input values u$_{sd}$ and u$_{sq}$ and the flux linkage observer stator voltage input values u*$_{sd}$ and u*$_{sq}$ of the motor in the dq coordinate system. The following describes the control method of the entire system, including step S1 to step S5.

S1. k is calculated based on a parameter of an induction motor, wherein k is a proportional relationship in the virtual voltage injection module. The calculation formula is as follows:

$$k = p\frac{R_r L_m}{L_r} + 1$$

S2. The stator voltage command input values u$_{sd}$ and u$_{sq}$ of the motor in the dq coordinate system are multiplied by the proportional relationship k respectively, to obtain the flux linkage observer stator voltage input values u*$_{sd}$ and u*$_{sq}$ in the dq coordinate system;

the operation is equivalent to injecting u$_{sd\_inj}$ and u$_{sq\_inj}$ on the basis of u$_{sd}$ and u$_{sq}$, wherein $$u_{sd\_inj} = (k-1)u_{sd}$$
$$u_{sq\_inj} = (k-1)u_{sq},$$

to satisfy $$u_{sd}^* = u_{sd\_inj} + u_{sd} = ku_{sd}$$
$$u_{sq}^* = u_{sq\_inj} + u_{sq} = ku_{sq},$$

in the formula, u$_{sd\_inj}$ is a virtual voltage injection value under the d-axis, and u$_{sq\_inj}$ is a virtual voltage injection value under the q-axis;

S3. A dynamic mathematical model of the flux linkage observer is constructed based on u*$_{sd}$ and u*$_{sq}$. The dynamic mathematical model is as follows:

$$\begin{cases} \frac{d}{dt}\hat{\vec{x}} = A_2\hat{\vec{x}} + \vec{u}_s^* \\ \hat{\vec{i}}_s = C\hat{\vec{x}} \end{cases}$$

wherein: $\hat{\vec{x}} = [\hat{\lambda}_{sd} \ \hat{\lambda}_{sq} \ \hat{\lambda}_{rd} \ \hat{\lambda}_{rq}]^T, \vec{u}_s^* = [u_{sd}^* \ u_{sq}^* \ 0 \ 0]^T$, $$\hat{\vec{i}}_s = [\hat{i}_{sd} \ \hat{i}_{sq}]^T, A_2 = \begin{bmatrix} a_{11} & \omega_e & a_{13} & 0 \\ -\omega_e & a_{11} & 0 & a_{13} \\ a_{31} & 0 & a_{33} & \omega_e - \hat{\omega}_r \\ 0 & a_{31} & -\omega_e + \hat{\omega}_r & a_{33} \end{bmatrix},$$

$$C = \begin{bmatrix} h_1 & 0 & h_2 & 0 \\ 0 & h_1 & 0 & h_2 \end{bmatrix}$$

$$a_{11} = \frac{-R_s}{\delta L_s}, a_{13} = \frac{R_s L_m}{\delta L_s L_r}, a_{31} = \frac{R_r L_m}{\delta L_s L_r}, a_{33} = \frac{-R_r}{\delta L_r}$$

$$h_1 = \frac{1}{\delta L_s}, h_2 = \frac{-L_m}{\delta L_s L_r}, \delta = 1 - \frac{L_m^2}{L_s L_r}$$

wherein $\hat{\lambda}_{sd}$ and $\hat{\lambda}_{sq}$ are stator flux linkage observation values under the d-axis and the q-axis respectively; $\hat{\lambda}_{rd}$ and $\hat{\lambda}_{rq}$ are rotor flux linkage observation values under the d-axis and the q-axis respectively; $\hat{i}_{sd}$ and $\hat{i}_{sq}$ are stator current observation values under the d-axis and the q-axis respectively; $\omega_e$ is synchronous rotating speed; R$_s$ and R$_r$ are motor stator resistance and rotor resistance respectively; L$_s$, L$_r$, and L$_m$ are motor stator side inductance, motor rotor side inductance, and motor mutual inductance respectively.

S4. An induction motor rotor speed $\hat{\omega}_r$ is observed using a rotating speed observer and a rotation angle $\hat{\theta}$ of the rotor flux linkage is observed using the flux linkage observer based on the dynamic mathematical model of the flux linkage observer;

$$\hat{\omega}_r = k_p[(i_{sd} - \hat{i}_{sd})\hat{\lambda}_{rq} - (i_{sq} - \hat{i}_{sq})\hat{\lambda}_{rd}] + k_i S_2$$

$$\omega_s = \frac{R_r L_m}{L_r \hat{\lambda}_{rd}} i_{sq}$$

$$\hat{\theta} = S_3$$

wherein k$_p$ and k$_i$ are proportional link gain and the integral link gain of the rotating speed observer respectively; i$_{sd}$ and i$_{sq}$ are stator current actual measured values under d-axis and q-axis respectively; $\hat{i}_{sd}$ and $\hat{i}_{sq}$ are stator current observation values under d-axis and q-axis respectively; $\hat{\lambda}_{rd}$ and $\hat{\lambda}_{rq}$ are rotor flux linkage observation values under the d-axis and q-axis respectively; S$_2$ is the time integral value of $[(i_{sd}-\hat{i}_{sd})\hat{\lambda}_{rq}-(i_{sq}-\hat{i}_{sq})\hat{\lambda}_{rd}]$, i$_{sq}$ is the stator current actual measured value under the q-axis, $\omega_s$ is slip rotating speed, R$_r$ is motor rotor resistance, L$_r$ and L$_m$ are motor rotor side inductance and motor mutual inductance respectively, and S$_3$ represents the time integral for $(\hat{\omega}_r+\omega_s)$.

S5. A control of speed sensor-less induction motor rotating speed and torque is implemented by using the observed rotor speed $\hat{\omega}_r$ for a rotating speed PI adjustment module and the flux linkage observer and using the observed rotor flux linkage rotation angle $\hat{\theta}$ for the 2-phase synchronous rotation coordinate/2-phase static coordinate conversion module.

S501, A rotating speed PI control is performed after taking a difference with a corresponding rotating speed command $\omega^*_r$ using the observed induction motor rotor speed $\hat{\omega}_r$ as a feedback value of the rotating speed PI adjustment module;

S502, The observed flux linkage rotation angle $\hat{\theta}$ is used for a coordinate conversion calculation in the 2-phase synchronous rotation coordinate/2-phase static coordinate conversion module;

S503, An output i*$_{sq}$ of the rotating speed PI adjustment module is used as a command of a q-axis current PI adjustment module and an output i*$_{sd}$ of a flux linkage current command given module is used as a command of a d-axis current PI adjustment module; induction motor two-phase currents i$_U$ and i$_V$ obtained by sampling via a current sensor is inputted to a 3-phase static coordinate/2-phase static coordinate conversion module, and then $\vec{i}_s$ is outputted to the 2-phase synchronous rotation coordinate/2-phase static coordinate conversion module, and lastly a d-axis current i$_{sd}$ and a q-axis current i$_{sq}$ in the 2-phase synchronous rotation coordinate system are obtained, and a current PI control is performed after using the obtained d-axis current and q-axis current as feedback values of a d-axis current PI regulator and a q-axis current PI regulator respectively and taking a difference with corresponding flux linkage current commands i*$_{sd}$ and i*$_{sq}$;

S504, The outputs u$_{sd}$ and u$_{sq}$ of the d-axis and q-axis current PI adjustment modules are inputted to the 2-phase synchronous rotation coordinate/2-phase static coordinate conversion module, which converts a motor input voltage command in the 2-phase synchronous rotation coordinate system to a motor input voltage command $\vec{u}_s$ in the 2-phase static coordinate system;

S505, $\vec{u}_s$ is outputted to a voltage space vector pulse width modulation module to generate a switching signal capable of controlling a switching device S$_A$, S$_B$, S$_C$, thereby achieving an object of controlling induction motor speed and torque.

Figure 3:
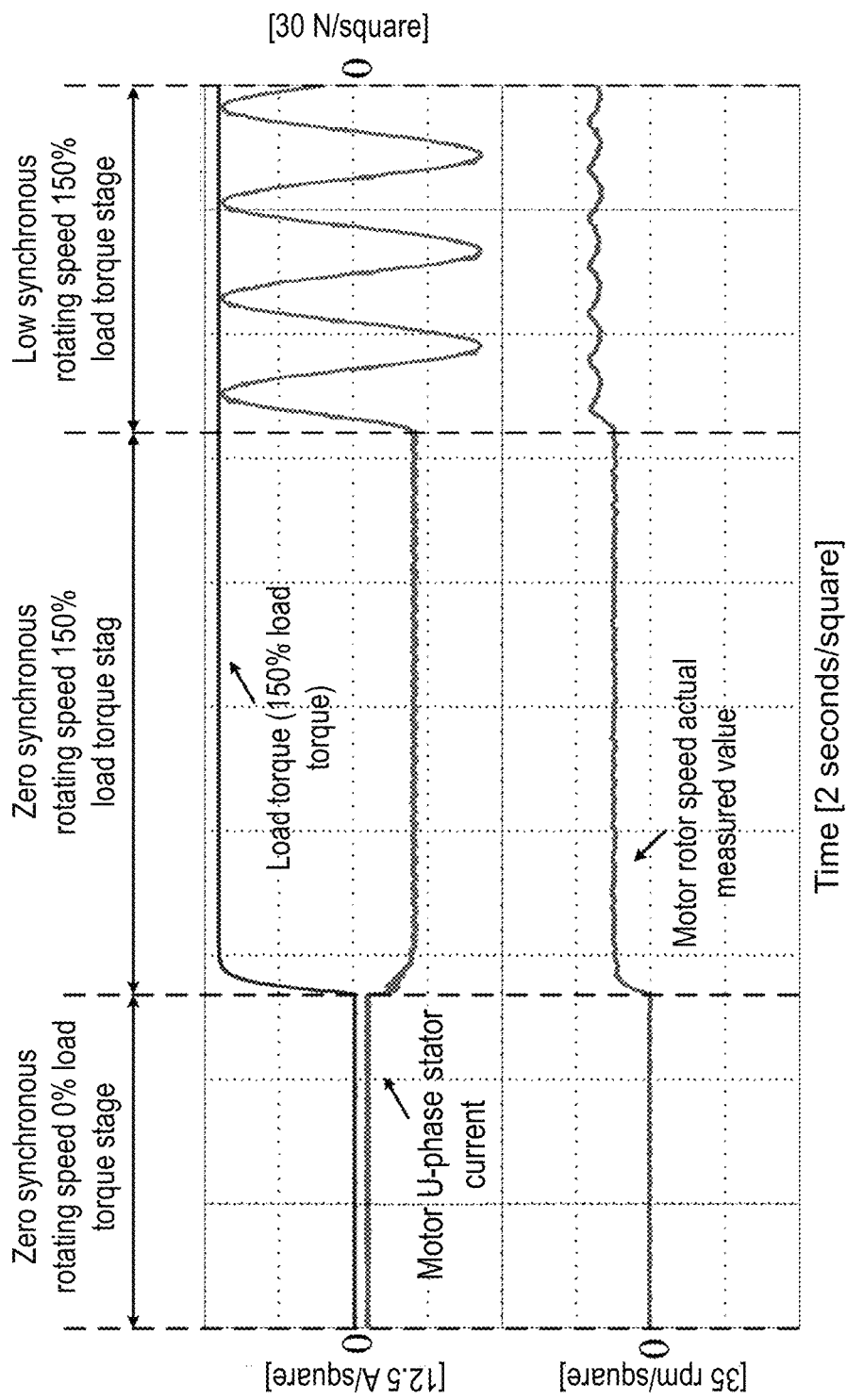
FIG. 3 is a graph of an induction motor rotor speed performance at different stages provided by an embodiment of the invention.

FIG. 3 is a graph of induction motor rotor speed performance at different stages provided by an embodiment of the invention.

As shown in FIG. 3, the motor rotor speed may be kept stable at motor zero synchronous rotating speed and 0% load torque, zero synchronous rotating speed and 150% load torque, and low synchronous rotating speed and 150% load torque.

Figure 4:
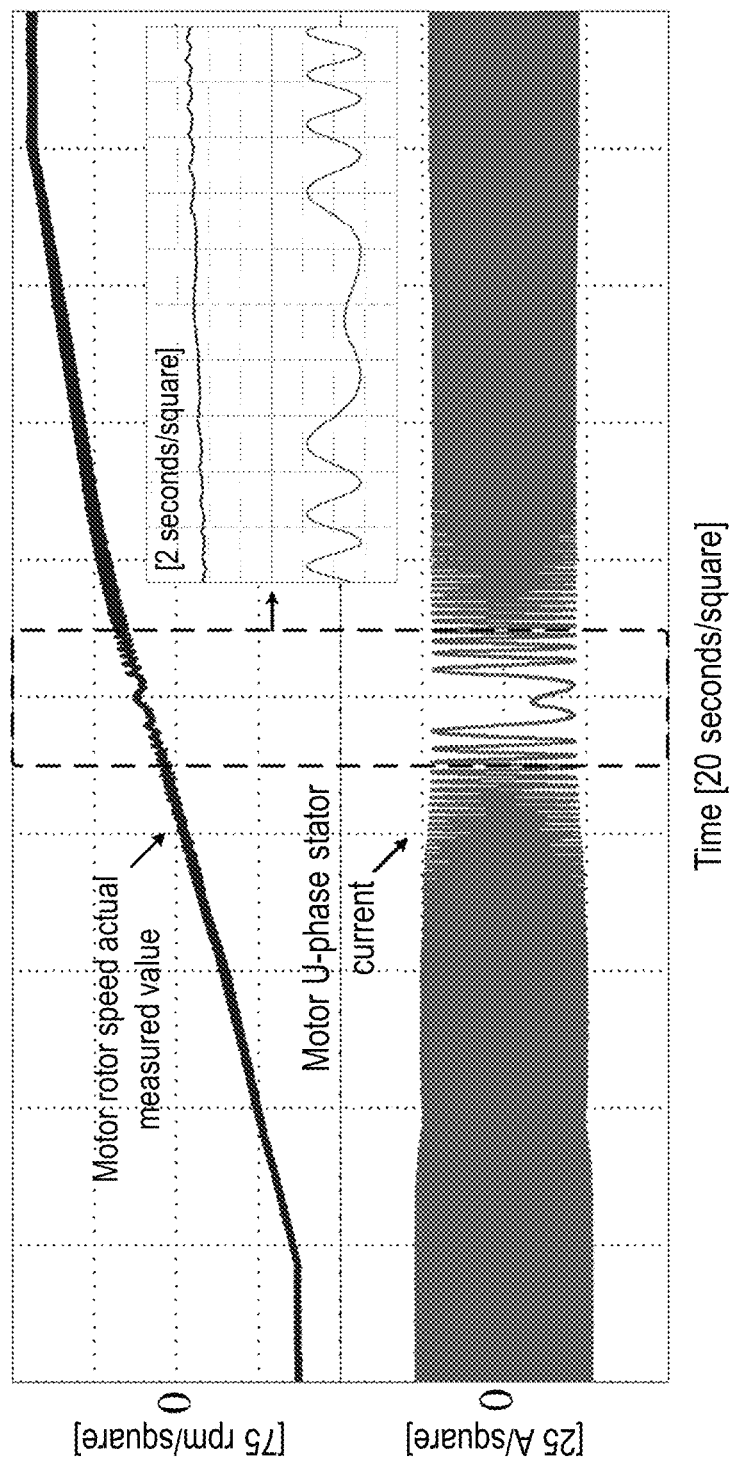
FIG. 4 is a graph showing the change of motor U-phase stator current and motor rotor speed command value with time provided by an embodiment of the invention.

FIG. 4 is a graph showing the change of motor U-phase stator current and motor rotor speed value with time provided by an embodiment of the invention.

As shown in FIG. 4, at 150% load torque, the motor rotor speed may be kept stable when crossing from −120 rpm to 120 rpm.

The above are only preferred specific implementations of the present application, but the scope of the present application is not limited thereto, and any change or replacement within the technical scope disclosed in this application that may be easily conceived by those skilled in the art shall be within the scope of the application. Therefore, the scope of the present application should be based on the scope of the claims.

What is claimed is:

1. A virtual voltage injection-based speed sensor-less driving control method for induction motor, wherein in the method, based on an existing speed sensor-less drive system for induction motor, a virtual voltage injection module is added between stator voltage command input values u$_{s\alpha}$ and u$_{s\beta}$ and flux linkage observer stator voltage input values u*$_{s\alpha}$ and u*$_{s\beta}$ of a motor in an αβ coordinate system, or a virtual voltage injection module is added between stator voltage command input values u$_{sd}$ and u$_{sq}$ and flux linkage observer stator voltage input values u*$_{sd}$ and u*$_{sq}$ of the motor in a dq coordinate system, and the method comprises the following steps:

S1. calculating k based on a parameter of an induction motor, wherein k is a proportional relationship in the virtual voltage injection module;

S2. multiplying the stator voltage command input values u$_{s\alpha}$ and u$_{s\beta}$ of the motor in the αβ coordinate system by the proportional relationship k respectively to obtain the flux linkage observer stator voltage input values u*$_{s\alpha}$ and u*$_{s\beta}$ in the αβ coordinate system; or multiplying the stator voltage command input values u$_{sd}$ and u$_{sq}$ of the motor in the dq coordinate system by the proportional relationship k respectively to obtain the flux linkage observer stator voltage input values u*$_{sd}$ and u*$_{sq}$ in the dq coordinate system;

the operation is equivalent to injecting u$_{s\alpha\_inj}$ and u$_{s\beta\_inj}$ on the basis of u$_{s\beta}$ and u$_{s\beta}$, wherein u$_{s\alpha\_inj}$=(k−1) u$_{s\alpha}$u$_{s\beta\_inj}$=(k−1)u$_{s\beta}$ to satisfy u*$_{s\alpha}$=u$_{s\alpha\_inj}$+u$_{s\alpha}$=ku$_{s\alpha}$, u*$_{s\beta}$=u*$_{s\beta\_inj}$+u*$_{s\beta}$=ku$_{s\beta}$, in the formula, u$_{s\alpha\_inj}$ is a virtual voltage injection value under an α-axis, and u$_{s\beta\_inj}$ is a virtual voltage injection value under a β-axis;

or the operation is equivalent to injecting u$_{sd\_inj}$ and u$_{sq\_inj}$ on the basis of u$_{sd}$ and u$_{sq}$, wherein u$_{sd\_inj}$=(k−1) u$_{sd}$u$_{sq\_inj}$=(k−1)u$_{sq}$ to satisfy u*$_{sd}$=u$_{sd\_inj}$=u$_{sd}$=ku$_{sd}$, u*$_{sq}$=u$_{sq\_inj}$+u*$_{sq}$=ku$_{sq}$, in the formula, u$_{sd\_inj}$ is a virtual voltage injection value under a d-axis, and u$_{sq\_inj}$ is a virtual voltage injection value under a q-axis;

S3. constructing a dynamic mathematical model of a flux linkage observer based on u*$_{s\alpha}$ and u*$_{s\beta}$ or u*$_{sd}$ and u*$_{sd}$;

S4. observing an induction motor rotor speed $\hat{\omega}_r$ using a rotating speed observer and observing a rotation angle θ of a rotor flux linkage using the flux linkage observer based on the dynamic mathematical model of the flux linkage observer;

S5. implementing a control of speed sensor-less induction motor rotating speed and torque by using the observed rotor speed $\hat{\omega}_r$ for a rotating speed PI adjustment module and the flux linkage observer and using the observed rotor flux linkage rotation angle θ for a 2-phase synchronous rotation coordinate/2-phase static coordinate conversion module;

wherein the αβ coordinate system is a 2-phase static coordinate system and the dq coordinate system is a 2-phase synchronous rotation coordinate system;

wherein step S5 comprises the following steps:

S501, performing a rotating speed PI control after taking a difference with a corresponding rotating speed command ω*$_r$ using the observed induction motor rotor speed $\hat{\omega}_r$ as a feedback value of the rotating speed PI adjustment module;

S502, using the observed flux linkage rotation angle θ for a coordinate conversion calculation in a 2-phase synchronous rotation coordinate/2-phase static coordinate conversion module;

S503, using an output i*$_{sq}$ of the rotating speed PI adjustment module as a command of a q-axis current PI adjustment module and using an output i*$_{sd}$ of a flux linkage current command given module as a command of a d-axis current PI adjustment module; inputting induction motor two-phase currents i$_U$ and i$_V$ obtained by sampling via a current sensor to a 3-phase static coordinate/2-phase static coordinate conversion module, and then outputting i$_s$ to the 2-phase synchronous rotation coordinate/2-phase static coordinate conversion module, and lastly obtaining a d-axis current i$_{sd}$ and a q-axis current $i_{sq}$ in the 2-phase synchronous rotation coordinate system, and performing a current PI control after using the obtained d-axis current and q-axis current as feedback values of a d-axis current PI regulator and a q-axis current PI regulator respectively and taking a difference with corresponding flux linkage current commands $i^*_{sd}$ and $i^*_{sq}$;

S504, inputting outputs $u_{sd}$ and $u_{sq}$ of the d-axis and q-axis current PI adjustment modules to the 2-phase synchronous rotation coordinate/2-phase static coordinate conversion module, which converts a motor input voltage command in the 2-phase synchronous rotation coordinate system to a motor input voltage command $u_s$ in the 2-phase static coordinate system;

S505, outputting $u_s$ to a voltage space vector pulse width modulation module to generate a switching signal for controlling switching devices SA,SB,SC, thereby achieving an object of controlling induction motor speed and torque.

2. The driving control method of claim 1, wherein the virtual voltage injection module is implemented by an adder, a multiplier, or a combination thereof.

3. The driving control method of claim 1, wherein a calculation formula of the proportional relationship k in step S1 is as follows:

$$k = p\frac{R_r L_m}{L_r} + 1$$

wherein p is a constant greater than zero, and is obtained based on a stability degree of induction motor speed and torque; $R_r$ is an induction motor rotor resistance; $L_m$ is an induction motor mutual inductance; and $L_r$ is an induction motor rotor side inductance.

4. The driving control method of claim 1, wherein the dynamic mathematical model of the flux linkage observer constructed based on $u^*_{s\alpha}$ and $u^{*s\beta}$ in step S3 is as follows:

$$\begin{cases} \frac{d}{dt}\hat{\vec{x}} = A_1\hat{\vec{x}} + \vec{u}^*_s \\ \hat{\vec{i}}_s = C\hat{\vec{x}} \end{cases}$$

wherein: $\hat{\vec{x}} = [\hat{\lambda}_{s\alpha} \ \hat{\lambda}_{s\beta} \ \hat{\lambda}_{r\alpha} \ \hat{\lambda}_{r\beta}]^T$, $\vec{u}^*_s = [u^*_{s\alpha} \ u^*_{s\beta} \ 0 \ 0]^T$, $$\hat{\vec{i}}_s = [\hat{i}_{s\alpha} \ \hat{i}_{s\beta}]^T, A_1 = \begin{bmatrix} a_{11} & 0 & a_{13} & 0 \\ 0 & a_{11} & 0 & a_{13} \\ a_{31} & 0 & a_{33} & -\hat{\omega}_r \\ 0 & a_{31} & \hat{\omega}_r & a_{33} \end{bmatrix},$$

$$C = \begin{bmatrix} h_1 & 0 & h_2 & 0 \\ 0 & h_1 & 0 & h_2 \end{bmatrix}$$

$$a_{11} = \frac{-R_s}{\delta L_s}, a_{13} = \frac{R_s L_m}{\delta L_s L_r}, a_{31} = \frac{R_r L_m}{\delta L_s L_r}, a_{33} = \frac{-R_r}{\delta L_r}$$

$$h_1 = \frac{1}{\delta L_s}, h_2 = \frac{-L_m}{\delta L_s L_r}, \delta = 1 - \frac{L_m^2}{L_s L_r}$$

the dynamic mathematical model of the flux linkage observer constructed based on $u^*_{sd}$ and $u^*_{sq}$ is as follows:

$$\begin{cases} \frac{d}{dt}\hat{\vec{x}} = A_2\hat{\vec{x}} + \vec{u}^*_s \\ \hat{\vec{i}}_s = C\hat{\vec{x}} \end{cases}$$

wherein: $\hat{\vec{x}} = [\hat{\lambda}_{sd} \ \hat{\lambda}_{sq} \ \hat{\lambda}_{rd} \ \hat{\lambda}_{rq}]^T$, $\vec{u}^*_s = [u^*_{sd} \ u^*_{sq} \ 0 \ 0]^T$, $$\hat{\vec{i}}_s = [\hat{i}_{sd} \ \hat{i}_{sq}]^T, A_2 = \begin{bmatrix} a_{11} & \omega_e & a_{13} & 0 \\ -\omega_e & a_{11} & 0 & a_{13} \\ a_{31} & 0 & a_{33} & \omega_e - \hat{\omega}_r \\ 0 & a_{31} & -\omega_e + \hat{\omega}_r & a_{33} \end{bmatrix},$$

$$C = \begin{bmatrix} h_1 & 0 & h_2 & 0 \\ 0 & h_1 & 0 & h_2 \end{bmatrix}$$

$$a_{11} = \frac{-R_s}{\delta L_s}, a_{13} = \frac{R_s L_m}{\delta L_s L_r}, a_{31} = \frac{R_r L_m}{\delta L_s L_r}, a_{33} = \frac{-R_r}{\delta L_r}$$

$$h_1 = \frac{1}{\delta L_s}, h_2 = \frac{-L_m}{\delta L_s L_r}, \delta = 1 - \frac{L_m^2}{L_s L_r}$$

wherein $\hat{\lambda}_{s\alpha}$, $\hat{\lambda}_{s\beta}$, $\hat{\lambda}_{sd}$, and $\hat{\lambda}_{sq}$ are stator flux linkage observation values under the α-axis, the β-axis, the d-axis, and the q-axis respectively; $\hat{\lambda}_{r\alpha}$, $\hat{\lambda}_{r\beta}$, $\hat{\lambda}_{rd}$, and $\hat{\lambda}_{rq}$ are rotor flux linkage observation values under the α-axis, the β-axis, the d-axis, and the q-axis respectively; $\hat{i}_{s\alpha}$, $\hat{i}_{s\beta}$, $\hat{i}_{sd}$, and $\hat{i}_{sq}$ are stator current observation values under the α-axis, the β-axis, the d-axis, and the q-axis respectively; $\omega_e$ is a synchronous rotating speed; $R_s$ and $R_r$ are a motor stator resistance and rotor resistance respectively; $L_s$, $L_r$, and $L_m$ are a motor stator side inductance, a motor rotor side inductance, and a motor mutual inductance respectively.

5. The driving control method of claim 1, wherein when the dynamic mathematical model of the flux linkage observer is constructed based on $u^*_{s\alpha}$ and $u^*_{s\beta}$, a calculation formula of the induction motor rotor speed $\omega_r$ in step S4 is as follows:

$$\hat{\omega}_r = k_p[(i_{s\alpha} - \hat{i}_{s\alpha})\hat{\lambda}_{r\beta} - (i_{s\beta} - \hat{i}_{s\beta})\hat{\lambda}_{r\alpha}] + k_I S_1$$

when the dynamic mathematical model of the flux linkage observer is constructed based on $u^*_{sd}$ and $u^*_{sq}$, the calculation formula of the induction motor rotor speed $\omega_r$ in step S4 is as follows:

$$\hat{\omega}_r = k_p[(i_{sd} - \hat{i}_{sd})\hat{\lambda}_{rq} - (i_{sq} - \hat{i}_{sq})\hat{\lambda}_{rd}] + k_I S_2$$

wherein $k_p$ and $k_I$ are a proportional link gain and an integral link gain of the rotating speed observer respectively; $i_{s\alpha}$, $i_{s\beta}$, $i_{sd}$, and $i_{sq}$ are stator current actual measured values under the α-axis, the β-axis, the d-axis, and the q-axis respectively; $\hat{i}_{s\alpha}$, $\hat{i}_{s\beta}$, $\hat{i}_{sd}$, and $\hat{i}_{sq}$ are stator current observation values under the α-axis, the β-axis, the d-axis, and the q-axis respectively; $\hat{\lambda}_{r\alpha}$, $\hat{\lambda}_{r\beta}$, $\hat{\lambda}_{rd}$, and $\hat{\lambda}_{rq}$ are rotor flux linkage observation values under the α-axis, the β-axis, the d-axis, and the q-axis respectively; and $S_1$ and $S_2$ are time integral values of $[(i_{s\alpha} - \hat{i}_{s\alpha})\hat{\lambda}_{r\beta} - (i_{s\beta} - \hat{i}_{s\beta})\hat{\lambda}_{r\alpha}]$ and $[(i_{sd} - \hat{i}_{sd})\hat{\lambda}_{rq} - (i_{sq} - \hat{i}_{sq})\hat{\lambda}_{rd}]$ respectively.

6. The driving control method of claim 1, wherein when the dynamic mathematical model of the flux linkage observer is constructed based on $u^*_{s\alpha}$ and $u^*_{s\beta}$, a calculation formula of the rotation angle $\hat{\theta}$ in step S4 is as follows:

$$\hat{\theta} = \arctan\frac{\hat{\lambda}_{r\beta}}{\hat{\lambda}_{r\alpha}}$$

when the dynamic mathematical model of the flux linkage observer is constructed based on $u^*_{sd}$ and $u^*_{sq}$, the calculation formula of the rotation angle $\hat{\theta}$ in step S4 is as follows:

$$\omega_s = \frac{R_r L_m}{L_r \hat{\lambda}_{rd}} i_{sq}$$

$$\hat{\theta} = S_3$$

wherein $\hat{\lambda}_{r\alpha}$, $\hat{\lambda}_{r\beta}$, and $\hat{\lambda}_{rd}$ are rotor flux linkage observation values under the α-axis, the β-axis, and the d-axis respectively; $i_{sq}$ is a stator current actual measured value under the q-axis, $\omega_s$ is a slip rotating speed, $R_r$ is a motor rotor resistance, $L_r$ and $L_m$ are a motor rotor side inductance and a motor mutual inductance respectively, and $S_3$ represents a time integral for $(\hat{\omega}_r + \omega_s)$.

7. A non-transitory computer-readable storage medium, wherein a computer program is stored on the computer-readable storage medium, and when the computer program is executed by a processor, the virtual voltage injection-based speed sensor-less driving control method for induction motor of claim 1 is implemented.

8. The driving control method of claim 2, wherein a calculation formula of the proportional relationship k in step S1 is as follows:

$$k = p\frac{R_r L_m}{L_r} + 1$$

wherein p is a constant greater than zero, and is obtained based on a stability degree of induction motor speed and torque; $R_r$ is an induction motor resistance; $L_m$ is an induction motor mutual inductance; and $L_r$ is an induction motor rotor side inductance.

9. The driving control method of claim 2, wherein the dynamic mathematical model of the flux linkage observer constructed based on $u^*_{s\alpha}$ and $u^*_{s\beta}$ in step S3 is as follows:

$$\begin{cases} \frac{d}{dt}\hat{\vec{x}} = A_1\hat{\vec{x}} + \vec{u}^*_s \\ \hat{\vec{i}}_s = C\hat{\vec{x}} \end{cases}$$

wherein: $\hat{\vec{x}} = [\hat{\lambda}_{s\alpha}\ \hat{\lambda}_{s\beta}\ \hat{\lambda}_{r\alpha}\ \hat{\lambda}_{r\beta}]^T$, $\vec{u}^*_s = [u^*_{s\alpha}\ u^*_{s\beta}\ 0\ 0]^T$, $$\hat{\vec{i}}_s = [\hat{i}_{s\alpha}\ \hat{i}_{s\beta}]^T, A_1 = \begin{bmatrix} a_{11} & 0 & a_{13} & 0 \\ 0 & a_{11} & 0 & a_{13} \\ a_{31} & 0 & a_{33} & -\hat{\omega}_r \\ 0 & a_{31} & \hat{\omega}_r & a_{33} \end{bmatrix},$$

$$C = \begin{bmatrix} h_1 & 0 & h_2 & 0 \\ 0 & h_1 & 0 & h_2 \end{bmatrix}$$

$$a_{11} = \frac{-R_s}{\delta L_s}, a_{13} = \frac{R_s L_m}{\delta L_s L_r}, a_{31} = \frac{R_r L_m}{\delta L_s L_r}, a_{33} = \frac{-R_r}{\delta L_r}$$

$$h_1 = \frac{1}{\delta L_s}, h_2 = \frac{-L_m}{\delta L_s L_r}, \delta = 1 - \frac{L_m^2}{L_s L_r}$$

the dynamic mathematical model of the flux linkage observer constructed based on $u^*_{sd}$ and $u^*_{sq}$ is as follows:

$$\begin{cases} \frac{d}{dt}\hat{\vec{x}} = A_2\hat{\vec{x}} + \vec{u}^*_s \\ \hat{\vec{i}}_s = C\hat{\vec{x}} \end{cases}$$

wherein: $\hat{\vec{x}} = [\hat{\lambda}_{sd}\ \hat{\lambda}_{sq}\ \hat{\lambda}_{rd}\ \hat{\lambda}_{rq}]^T$, $\vec{u}^*_s = [u^*_{sd}\ u^*_{sq}\ 0\ 0]^T$, $$\hat{\vec{i}}_s = [\hat{i}_{sd}\ \hat{i}_{sq}]^T, A_2 = \begin{bmatrix} a_{11} & \omega_e & a_{13} & 0 \\ -\omega_e & a_{11} & 0 & a_{13} \\ a_{31} & 0 & a_{33} & \omega_e - \hat{\omega}_r \\ 0 & a_{31} & -\omega_e + \hat{\omega}_r & a_{33} \end{bmatrix},$$

$$C = \begin{bmatrix} h_1 & 0 & h_2 & 0 \\ 0 & h_1 & 0 & h_2 \end{bmatrix}$$

$$a_{11} = \frac{-R_s}{\delta L_s}, a_{13} = \frac{R_s L_m}{\delta L_s L_r}, a_{31} = \frac{R_r L_m}{\delta L_s L_r}, a_{33} = \frac{-R_r}{\delta L_r}$$

$$h_1 = \frac{1}{\delta L_s}, h_2 = \frac{-L_m}{\delta L_s L_r}, \delta = 1 - \frac{L_m^2}{L_s L_r}$$

wherein $\hat{\lambda}_{s\alpha}$, $\hat{\lambda}_{s\beta}$, $\hat{\lambda}_{sd}$, and $\hat{\lambda}_{sq}$ are stator flux linkage observation values under the α-axis, the β-axis, the d-axis, and the q-axis respectively; $\hat{\lambda}_{r\alpha}$, $\hat{\lambda}_{r\beta}$, $\hat{\lambda}_{rd}$, and $\hat{\lambda}_{rq}$ are rotor flux linkage observation values under the α-axis, the β-axis, the d-axis, and the q-axis respectively; $\hat{i}_{s\alpha}$, $\hat{i}_{s\beta}$, $\hat{i}_{sd}$, and $\hat{i}_{sq}$ are stator current observation values under the α-axis, the β-axis, the d-axis, and the q-axis respectively; $\omega_e$ is a synchronous rotating speed; $R_s$ and $R_r$ are a motor stator resistance and rotor resistance respectively; $L_s$, $L_r$, and $L_m$ are a motor stator side inductance, a motor rotor side inductance, and a motor mutual inductance respectively.

10. The driving control method of claim 2, wherein when the dynamic mathematical model of the flux linkage observer is constructed based on $u^*_{s\alpha}$ and $u^*_{s\beta}$, a calculation formula of the induction motor rotor speed $\hat{\omega}_r$ in step S4 is as follows:

$$\hat{\omega}_r = k_p[(i_{s\alpha} - \hat{i}_{s\alpha})\hat{\lambda}_{r\beta} - (i_{s\beta} - \hat{i}_{s\beta})\hat{\lambda}_{r\alpha}] + k_I S_1$$

when the dynamic mathematical model of the flux linkage observer is constructed based on $u^*_{sd}$ and $u^{*sq}$, the calculation formula of the induction motor rotor speed $\hat{\omega}_r$ in step S4 is as follows:

$$\hat{\omega}_r = k_p[(i_{sd} - \hat{i}_{sd})\hat{\lambda}_{rq} - (i_{sq} - \hat{i}_{sq})\hat{\lambda}_{rd}] + k_I S_2$$

wherein $k_p$ and $k_I$ are a proportional link gain and an integral link gain of the rotating speed observer respectively; $i_{s\alpha}$, $i_{s\beta}$, $i_{sd}$, and $i_{sq}$ are stator current actual measured values under the α-axis, the β-axis, the d-axis, and the q-axis respectively; $\hat{i}_{s\alpha}$, $\hat{i}_{s\beta}$, $\hat{i}_{sd}$, and $\hat{i}_{sq}$ are stator current observation values under the α-axis, the β-axis, the d-axis, and the q-axis respectively; $\hat{\lambda}_{r\alpha}$, $\hat{\lambda}_{r\beta}$, $\hat{\lambda}_{rd}$, and $\hat{\lambda}_{rq}$ are rotor flux linkage observation values under the α-axis, the β-axis, the d-axis, and the q-axis respectively; and $S_1$ and $S_2$ are time integral values of $[(i_{s\alpha} - \hat{i}_{s\alpha})\hat{\lambda}_{r\beta} - (i_{s\beta} - \hat{i}_{s\beta})\hat{\lambda}_{r\alpha}]$ and $[(i_{sd} - \hat{i}_{sd})\hat{\lambda}_{rq} - (i_{sq} - \hat{i}_{sq})\hat{\lambda}_{rd}]$ respectively.

11. The driving control method of claim 2, wherein when the dynamic mathematical model of the flux linkage observer is constructed based on $u^*_{s\alpha}$ and $u^*_{s\beta}$, a calculation formula of the rotation angle $\hat{\theta}$ in step S4 is as follows:

$$\hat{\theta} = \arctan\frac{\hat{\lambda}_{r\beta}}{\hat{\lambda}_{r\alpha}}$$

when the dynamic mathematical model of the flux linkage observer is constructed based on $u^*_{sd}$ and $u^*_{sq}$, the calculation formula of the rotation angle $\hat{\theta}$ in step S4 is as follows:

$$\omega_s = \frac{R_r L_m}{L_r \hat{\lambda}_{rd}} i_{sq}$$

$$\hat{\theta} = S_3$$

wherein $\hat{\lambda}_{r\alpha}$, $\hat{\lambda}_{r\beta}$, and $\hat{\lambda}_{rd}$ are rotor flux linkage observation values under the α-axis, the α-axis, and the d-axis respectively; $i_{sq}$ is a stator current actual measured value under the q-axis, $\omega_s$ is a slip rotating speed, $R_r$ is a motor rotor resistance, $L_r$ and $L_m$ are a motor rotor side inductance and a motor mutual inductance respectively, and $S_3$ represents a time integral for $(\hat{\omega}_r + \omega_s)$.

* * * * *